(12) United States Patent
Dougherty et al.

(10) Patent No.: US 7,423,645 B2
(45) Date of Patent: Sep. 9, 2008

(54) SYSTEM FOR SOFTENING IMAGES IN SCREEN SPACE

(75) Inventors: Michael Alan Dougherty, Issaquah, WA (US); David Scott McCoy, Bellevue, WA (US); Michael Sean Mounier, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 11/141,027

(22) Filed: Jun. 1, 2005

(65) Prior Publication Data

US 2006/0274064 A1 Dec. 7, 2006

(51) Int. Cl.
G06T 15/50 (2006.01)
G06T 15/60 (2006.01)
G06T 15/00 (2006.01)

(52) U.S. Cl. ...................... 345/426; 345/419
(58) Field of Classification Search .................. 345/426
See application file for complete search history.

(56) References Cited

U.S. PATENT DOCUMENTS

| | | | | |
|---|---|---|---|---|
| 4,737,921 A * | 4/1988 | Goldwasser et al. | ......... | 345/421 |
| 5,289,305 A * | 2/1994 | Lake, Jr. | ...................... | 348/578 |
| 5,812,139 A * | 9/1998 | Morimoto | .................... | 345/428 |
| 6,349,113 B1 * | 2/2002 | Mech et al. | ............ | 375/240.08 |
| 6,548,800 B2 * | 4/2003 | Chen et al. | ............... | 250/208.1 |
| 6,661,918 B1 * | 12/2003 | Gordon et al. | .............. | 382/173 |
| 7,106,326 B2 * | 9/2006 | Deering et al. | .............. | 345/426 |
| 7,202,867 B1 * | 4/2007 | Rodriguez et al. | .......... | 345/426 |
| 2003/0194110 A1 * | 10/2003 | Brodsky | ..................... | 382/103 |
| 2004/0239673 A1 * | 12/2004 | Schmidt | ..................... | 345/426 |

OTHER PUBLICATIONS

Brabec, S.; Seidel, H.-P.; "Hardware-accelerated rendering of antialiased shadows with shadow maps", Proceedings Computer Graphics International 2001, Jul. 3-6, 2001, pp. 209-214.*
Michael D. McCool, "Shadow vol. reconstruction from depth maps", ACM Transactions on Graphics (TOG), v. 19 n.1, p. 1-26, Jan. 2000.*
Ulf Assarsson, Michael Dougherty, Michael Mounier, Tomas Akenine-Möller, "An optimized soft shadow vol. algorithm with real-time performance", Proceedings of the ACM SIGGRAPH/EUROGRAPHICS Conference on Graphics hardware, Jul. 26-27, 2003, pp. 33-40, 131.*
Paul Haeberli, Kurt Akeley, "The accumulation buffer: hardware support for high-quality rendering", ACM SIGGRAPH Computer Graphics, v.24 n.4, p. 309-318, Aug. 1990.*
M. Isard, M. Shand, A. Heirich, "Distributed rendering of interactive soft shadows", Proceedings of the Fourth Eurographics Workshop on Parallel Graphics and Visualization, Sep. 9-10, 2002, Blaubeuren, Germany, pp. 71-76, 148.*

(Continued)

Primary Examiner—Kee M. Tung
Assistant Examiner—Roberta Prendergast
(74) Attorney, Agent, or Firm—Lee & Hayes, PLLC

(57) ABSTRACT

A graphics rendering system and method is disclosed, in which color values for certain pixels appearing on the screen may be adjusted to create a blurring effect. A pixel-by-pixel comparison may be used to compare differences in depth, as noted in a depth buffer, and if pixel depths are sufficiently close, the pixel's color may be softened to take into account color values of neighboring pixels.

18 Claims, 15 Drawing Sheets

OTHER PUBLICATIONS

Tobias Isenberg, Bert Freudenberg, Nick Halper, Stefan Schlechtweg, Thomas Strothotte, "A Developer's Guide to Silhouette Algorithms for Polygonal Models", IEEE Computer Graphics and Applications, v.23 n.4, p. 28-37, Jul. 2003.*

Jakobsen, B.; Christensen, N.J.; Larsen, B.D.; Petersen, K.S.; "Boundary correct real-time soft shadows", Proceedings of Computer Graphics International, 2004, pp. 232-239.*

Pinel, J.-M.; Nicolas, H.; "Shadows analysis and synthesis in natural video sequences", Proceedings of 2002 International Conference on Image Processing, vol. 3, Jun. 24-28, 2002, pp. III-285-III-288.*

Reeves, W. T., Salesin, D. H., and Cook, R. L., 1987, "Rendering antialiased shadows with depth maps", Proceedings of the 14th Annual Conference on Computer Graphics and interactive Techniques, M. C. Stone, Ed., SIGGRAPH '87, ACM Press, NY, NY, pp. 283-291.*

Mark Segal, Carl Korobkin, Rolf van Widenfelt, Jim Foran, Paul Haeberli, "Fast shadows and lighting effects using texture mapping", ACM SIGGRAPH Computer Graphics, v.26 n.2, p. 249-252, Jul. 1992.*

Pradeep Sen, Mike Cammarano, Pat Hanrahan, "Shadow silhouette maps", ACM Transactions on Graphics (TOG), v.22 n.3, Jul. 2003, pp. 521-526.*

Williams, L. 1978. Casting curved shadows on curved surfaces. In Proceedings of the 5th Annual Conference on Computer Graphics and interactive Techniques (Aug. 23-25, 1978). SIGGRAPH '78. ACM Press, New York, NY, 270-274.*

Chris Wyman, Charles Hansen, "Penumbra maps: approximate soft shadows in real-time", Proceedings of the 14th Eurographics workshop on Rendering, Jun. 25-27, 2003, Leuven, Belgium, 7 pages.*

Zhengming Ying; Min Tang; Jinxiang Dong; "Soft shadow maps for area light by area approximation", Proceedings 10th Pacific Conference on Computer Graphics and Applications, Oct. 9-11, 2002, pp. 442-443.*

Spencer, G., Shirley, P., Zimmerman, K., and Greenberg, D. P. 1995. Physically-based glare effects for digital images. In Proceedings of the 22nd Annual Conference on Computer Graphics and interactive Techniques S. G. Mair and R. Cook, Eds. SIGGRAPH '95. ACM, New York, NY, 325-334.*

Tumblin, J., Hodgins, J. K., and Guenter, B. K. 1999. Two methods for display of high contrast images. ACM Trans. Graph. 18, (Jan. 1, 1999), 56-94.*

Hasenfratz, J.-M., Lapierre, M., Holzchuch, N., and Sillion, F.X., A Survey of Real-Time Soft Shadows Algorithms, Article, Eurographics 2003, 20 pp., STAR—State of the Art Report, © The Eurographics Association 2003, http://w3imagis.imag.fr/Publications/2003/HLHS03/index.fr.html.

* cited by examiner

SYSTEM FOR SOFTENING IMAGES IN SCREEN SPACE

TECHNICAL FIELD

The present application relates generally to rendering images on a display screen, such as computer-generated graphics for video games. Certain aspects relate to time-efficient approximation algorithms for softening portions of a rendered image to present a more pleasing appearance of a shadow or other blurred item within the image.

BACKGROUND OF THE INVENTION

As computer hardware and software continue their never-ending cycle of improvement, there is always a need for techniques that can maximize their performance. This is true for the vast majority of computer products, and products using computer graphics, such as video games, are no exception. In fact, computer graphics programs are among the most demanding of their hardware, so much so that most games today require a dedicated graphics processor chip in addition to the basic central processing unit (CPU) of the hardware device.

Computer graphics are calculation intensive because real-world physics is calculation intensive. Simulating a simple bouncing ball requires many calculations to determine its behavior (e.g., its acceleration and velocity as it falls, the new direction it takes after it hits, etc.) and appearance (e.g., its change in shape when it hits the ground, the shadows it casts, etc.). Adding objects to the mix, such as a player to catch the ball, or different light sources, further complicates process, and this complicated process must be performed fast enough to generate the 30+ frames per second that typical programs deliver.

One such area of computer graphics deals with the behavior of light, and the shadows that are cast by objects in the light. FIG. 6a shows a simple example, with a point light source 601, an occluding object 602, a surface 603 on which the shadow is cast, and the resulting shadow 604. Simple point light sources, however, are a mathematical construct. Real-world sources of light are larger than a single point, and result in the behavior shown in FIG. 6b. In FIG. 6b, a second point light source 605 may be adjacent to the first point light source 601 (e.g., two points along the surface of a light bulb), and may cast a separate shadow (606 and 607) on surface 603. The combined result of these two point sources is a darker shadow portion 606, and lighter shadow portions 607, 608. If more point sources (not shown) are included, one would expect to see a central darker shadow portion, and a lighter, blurred, shadow on the edges.

So for example, using the scene in FIG. 7, an occluding object 701 is in the light of a larger light source 702, and casts a shadow 703. In reality, one would expect some portions 704 of the shadow to be a bit lighter or blurry, while other portions 705 would be darker. Prior attempts to model this behavior have treated the light source 702 as a collection of many point light sources, calculating separate shadows from each point light source, and then combining the various resulting shadows to form the final shadow. If enough point light sources are used, such an approach may result in a realistic shadow. The drawback, however, is the extra computation time required for the many point light sources (which, for larger light sources, may involve thousands of separate point sources). Performing these extra calculations can slow down the computing system, and if taken too far, may lead to poor performance (either in an image that does not look realistic, or in an unsatisfactory slow refresh rate).

SUMMARY OF THE INVENTION

Described herein are several novel systems and methods for softening images, such as shadows, that may alleviate some or all of the concerns noted above. In some aspects, a soft shadow buffer is created to identify pixels on a display screen that are to have softened shadows. The soft shadow buffer may be created by using neighbor pixel distance comparisons, where neighbor pixels will have a soft shadow effect on a given pixel if the neighbor is within a predetermined threshold depth away from the given pixel.

In some aspects, a number of screen buffers may be created in memory to store data for each pixel on the screen, or portion thereof. A color buffer may be used for the final, as-displayed image, while other buffers may exist behind-the-scenes addressing individual characteristics of the pixels. For example, a depth buffer may identify a depth value for each pixel, identifying each pixel's relative distance away from the viewer of a 3-D scene. A binary shadow buffer may exist, with a simple binary value indicating whether a given pixel is in shadow.

Aspects of the present invention may generate a soft shadow buffer, which may identify a degree of shadow beyond the simple "yes" or "no" found in the binary shadow buffer. The soft shadow buffer may be generated by comparing, for each pixel, the relative depth values of that pixel's neighboring pixels. Neighbors that are close enough in depth may have an effect on the pixel's shadow, such that the neighbor pixel's color and/or shadow value may be blended with the pixel's own value.

A neighbor pixel's effect may be weighted by a weight value to help present a more realistic effect in this blending. The neighbor's identification and weight value may be determined using a filter kernel algorithm.

The resulting soft shadow buffer may then be provided as input to any desired shading function to add shadow, color blooms, or blurring effects to the image.

In some aspects, all pixels are considered and represented in the soft shadow buffer. In other aspects, only those pixels that are on a border between in-shadow and not-in-shadow are considered. Yet further aspects may avoid storing a separate soft shadow buffer altogether, and may instead directly apply the soft shadow results to the final color buffer on a pixel-by-pixel basis. The use of some and/or all of the features described herein may offer a faster approach to generating pleasing visual effects in a displayed image. These and other aspects are described herein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
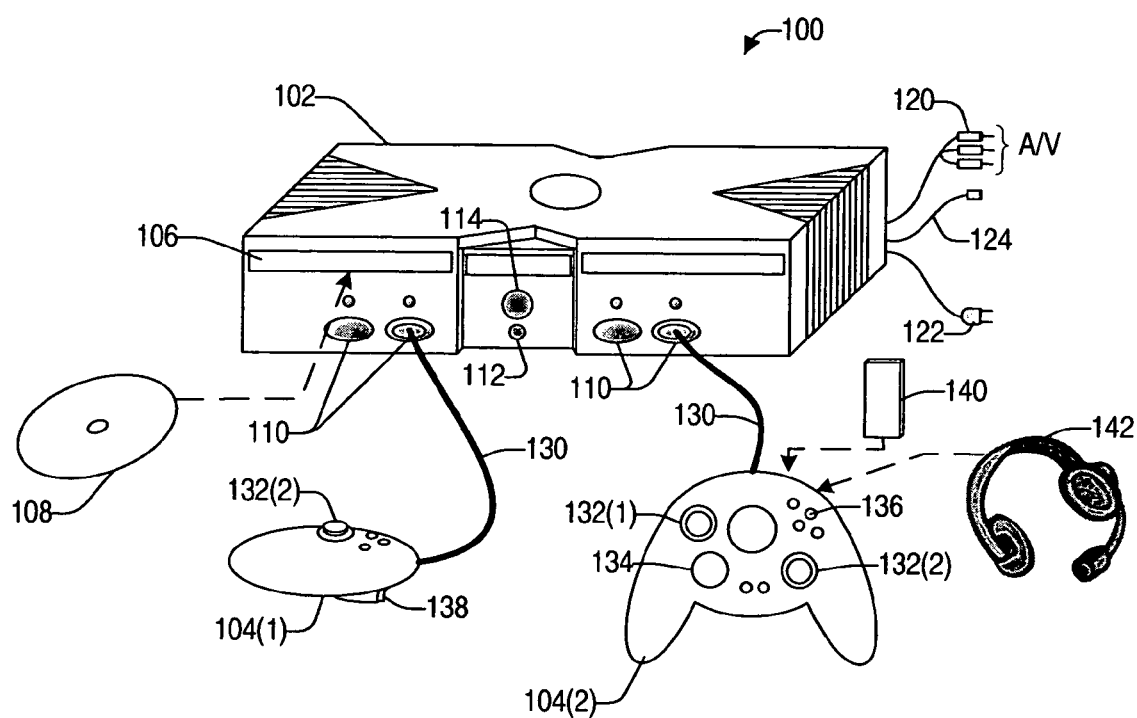
FIG. 1 illustrates a gaming system that may be used according to an illustrative embodiment of the invention.

FIG. 1 illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the invention. Neither should the gaming system environment 100 be interpreted as having any dependency or requirement relating to any one or combination of components illustrated in the illustrative operating gaming system environment 100.

Aspects of the present invention are operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

Aspects of the present invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and up to four controllers, as represented by controllers 104(1) and 104(2).

The game console 102 is equipped with an internal hard disk drive and a portable media drive 106 that supports various forms of portable storage media as represented by optical storage disc 108. Examples of suitable portable storage media include DVD, CD-ROM, game discs, and so forth.

Game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 is equipped with two thumbsticks 132(1) and 132(2), a D-pad 134, buttons 136 (e.g., 'A', 'B', 'X', 'Y'), and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., Windows Media Audio (WMA) format), or from online streaming sources; and digital audio/video played from a DVD disc in the portable media drive 106, from a file on the hard disk drive (e.g., Active Streaming Format), or from online streaming sources.

Figure 2:
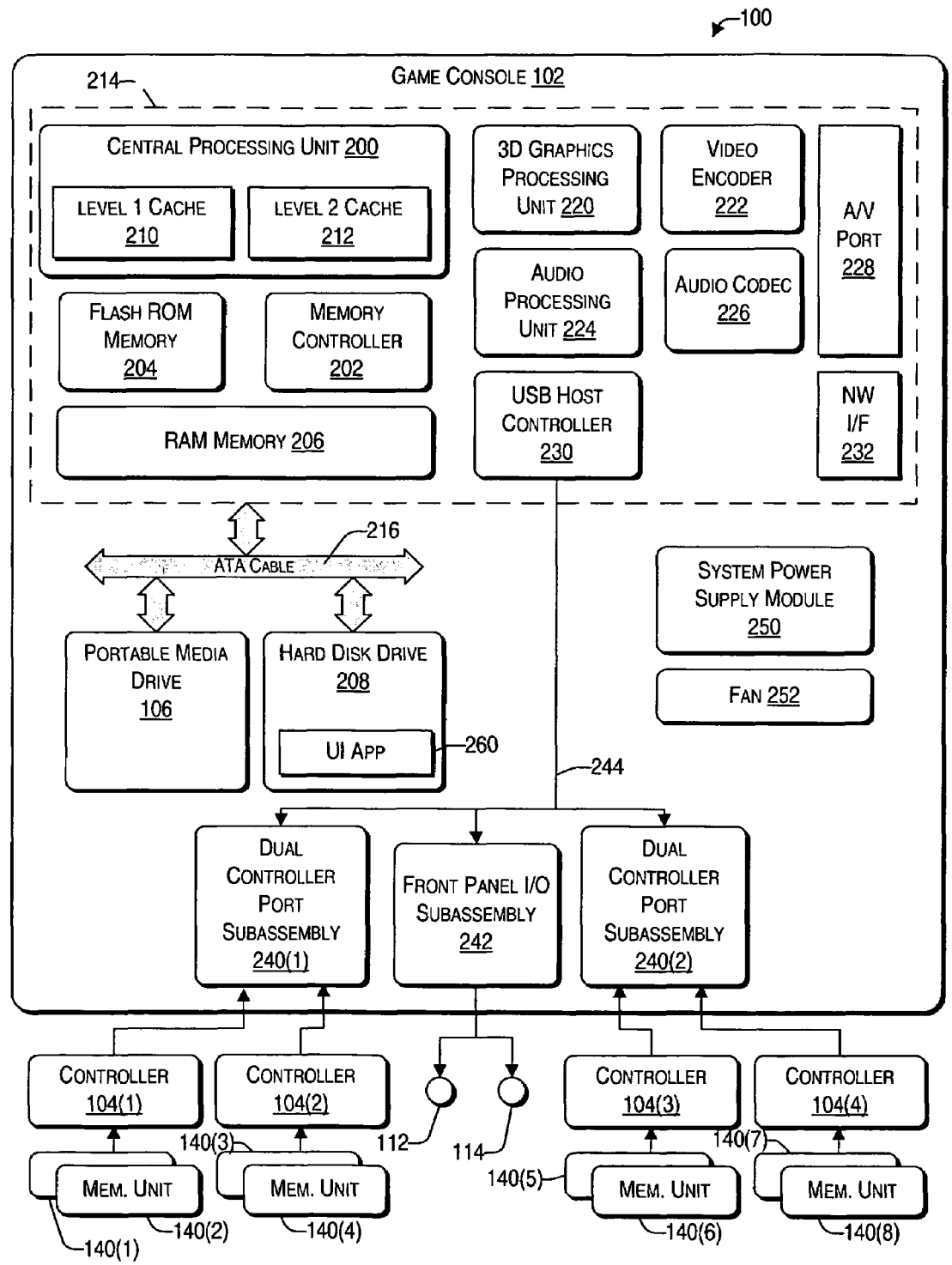
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas.

The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
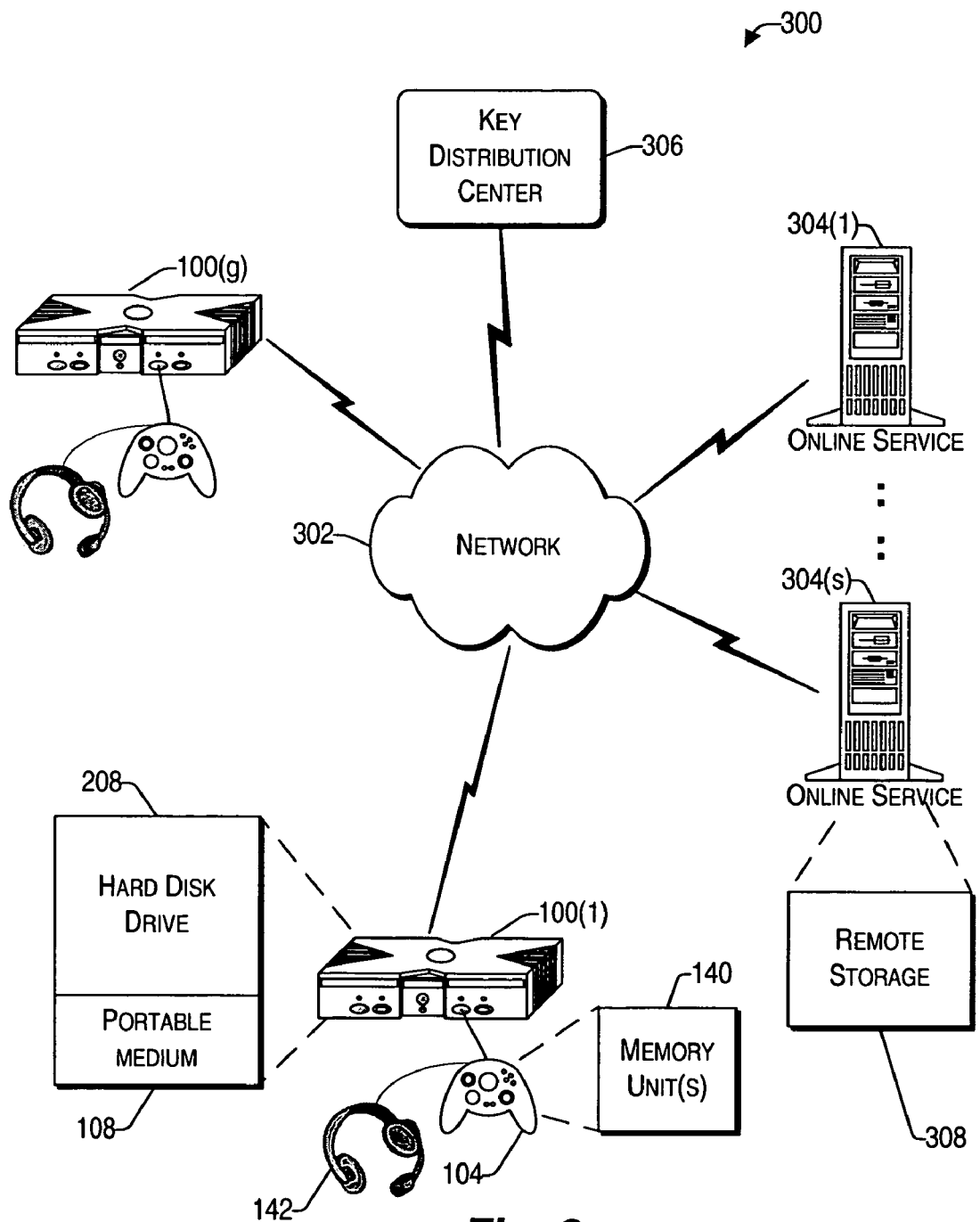
FIG. 3 illustrates a block diagram of a network gaming system according to an illustrative embodiment of the invention.

FIG. 3 shows an exemplary network gaming environment 300 that interconnects multiple gaming systems 100(1), ..., 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), ..., 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
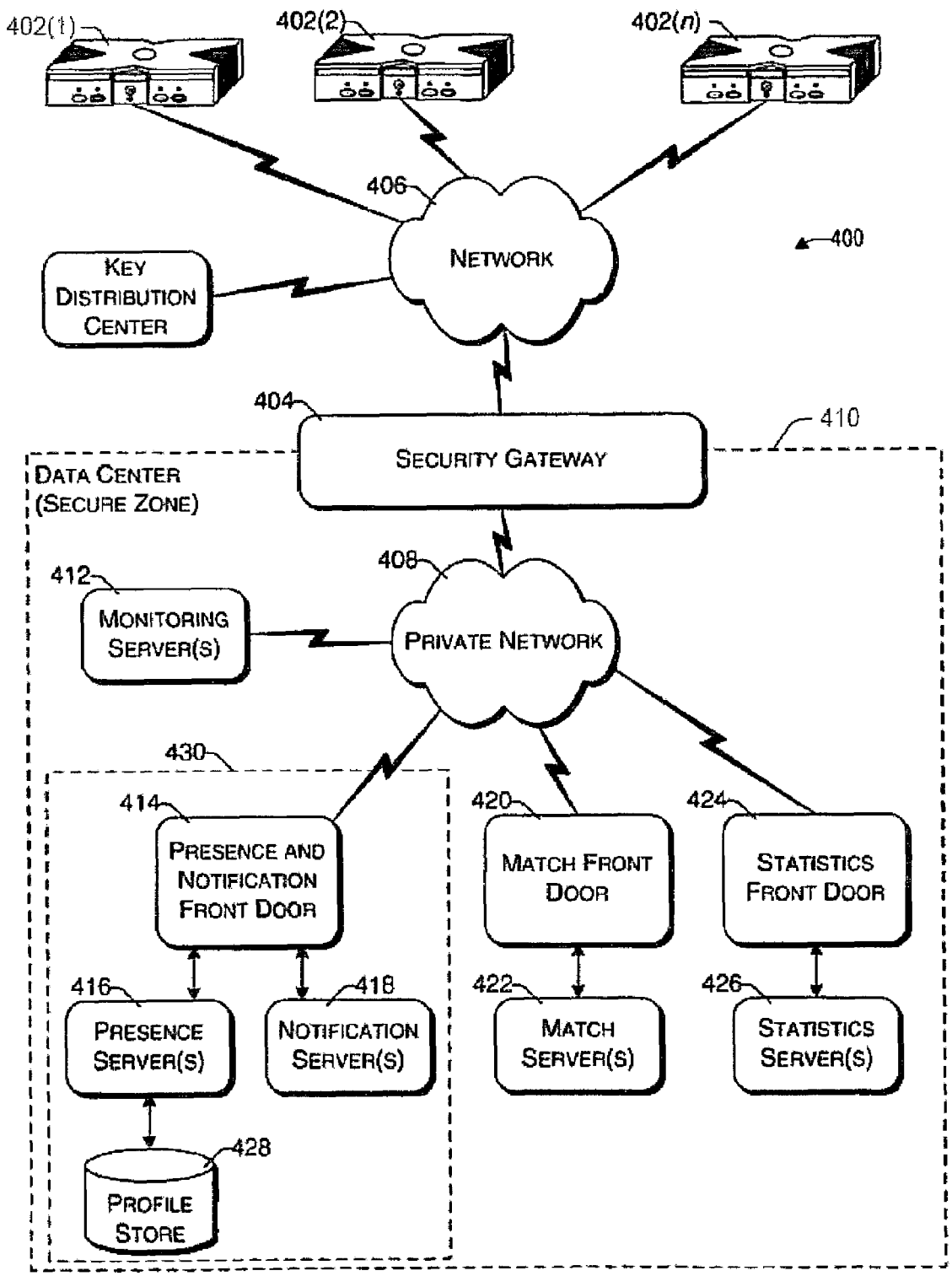
FIG. 4 illustrates another block diagram of an online gaming environment according to an illustrative embodiment of the invention.

FIG. 4 is a block diagram of another illustrative online gaming environment 400, e.g. XBOX® LIVE by Microsoft Corporation of Redmond, Wash. Multiple game consoles 402(1), 402(2), ..., 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102,402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device (s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

One or more aspects of the invention may be embodied in computer-executable instructions (i.e., software) stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as a hard disk 208, removable storage media 108, solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

Figure 5:
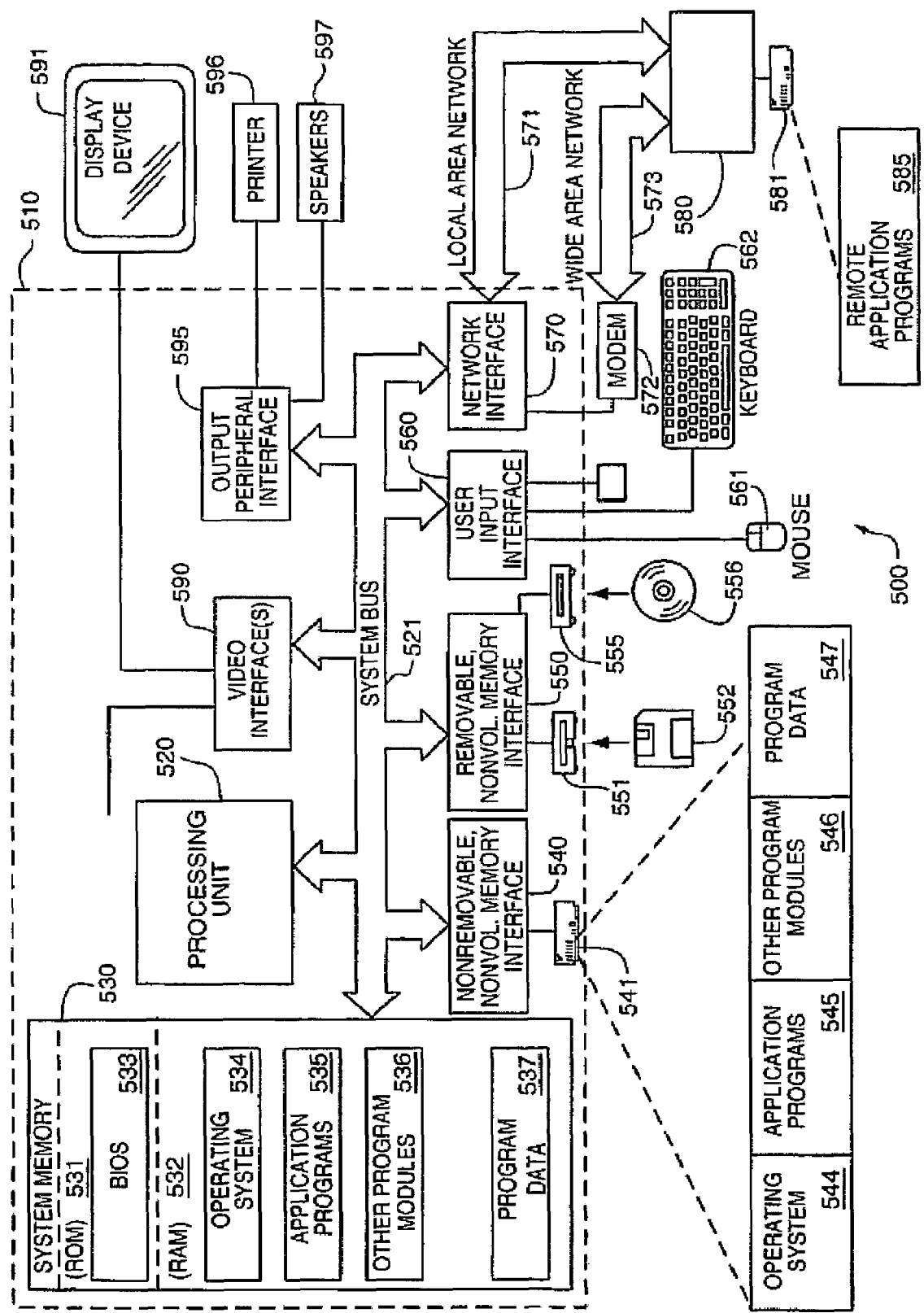
FIG. 5 illustrates a block diagram of a general computing system in which one or more aspects of the present invention may be implemented.
Figure 6A:
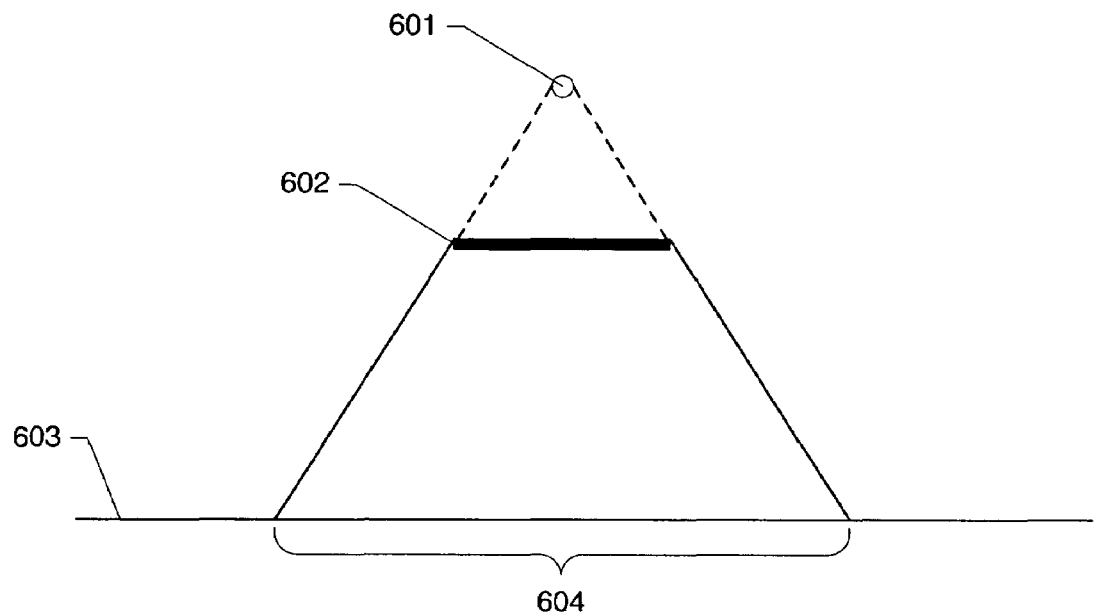
FIGS. 6a and 6b illustrate basic concepts of shadows involving one or more point light sources and an occluding object.
Figure 6B:
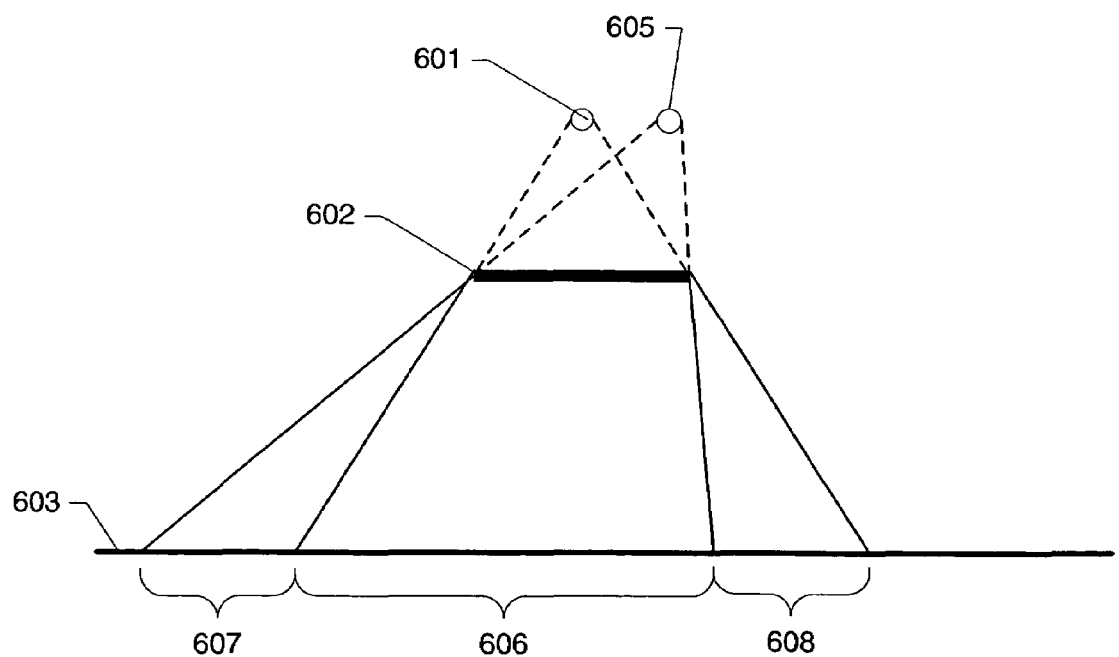

Aspects of the present invention are not limited to console computing environments. Indeed, these aspects may also be implemented in video games that operate on personal computers (PC). FIG. 5 illustrates an example of a suitable computing system environment 500 on which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

As noted above, the present application relates generally to a system for softening or blurring certain portions of a graphics image to present a more appealing image. The features described herein may be used in generating a displayed image, and may be embodied in any suitable format. For example, the features may be implemented as computer-executable instructions found on a computer-readable medium, such as an external storage medium (e.g., disk 108, 556, 552, etc.) and/or an internal medium, such as a hard drive (e.g. 541), system memory 530, etc.

Figure 8A:
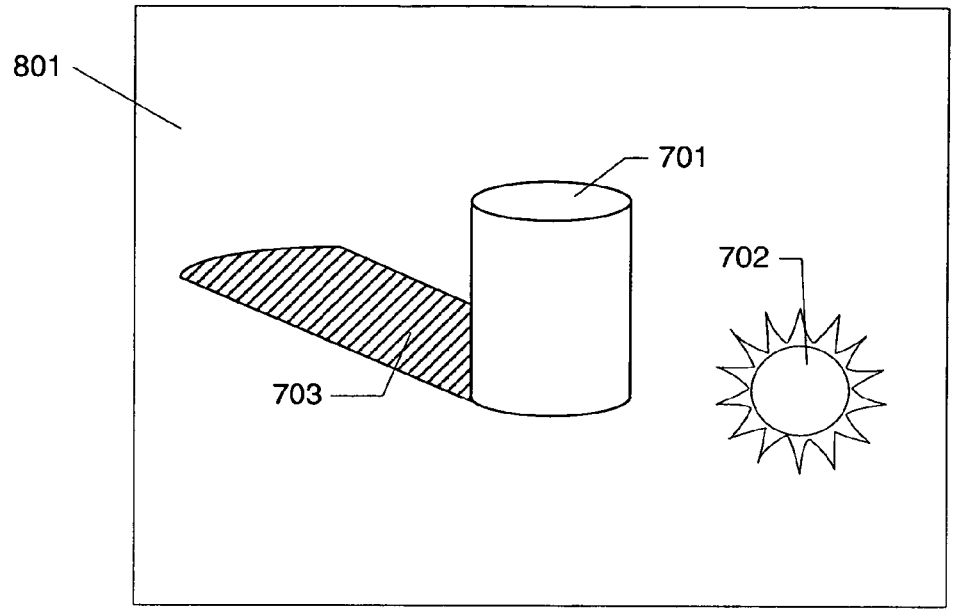
FIGS. 8a-c illustrate an example screen display, with pixels, that can be rendered using one or more aspects described herein.
Figure 8B:
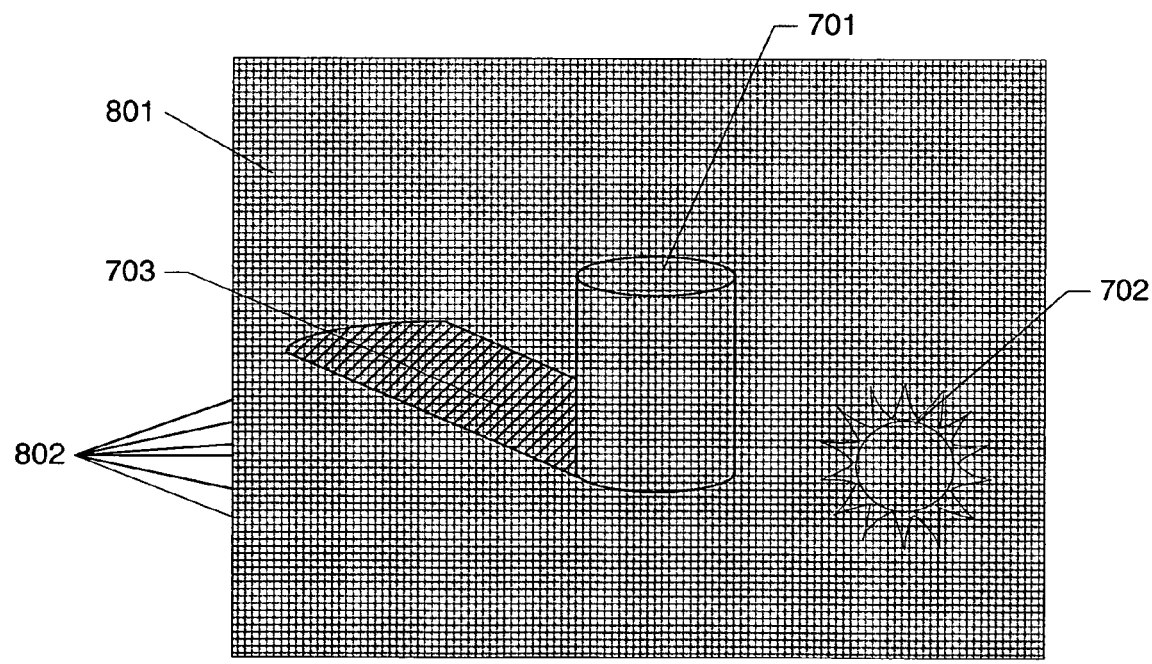
Figure 8C:
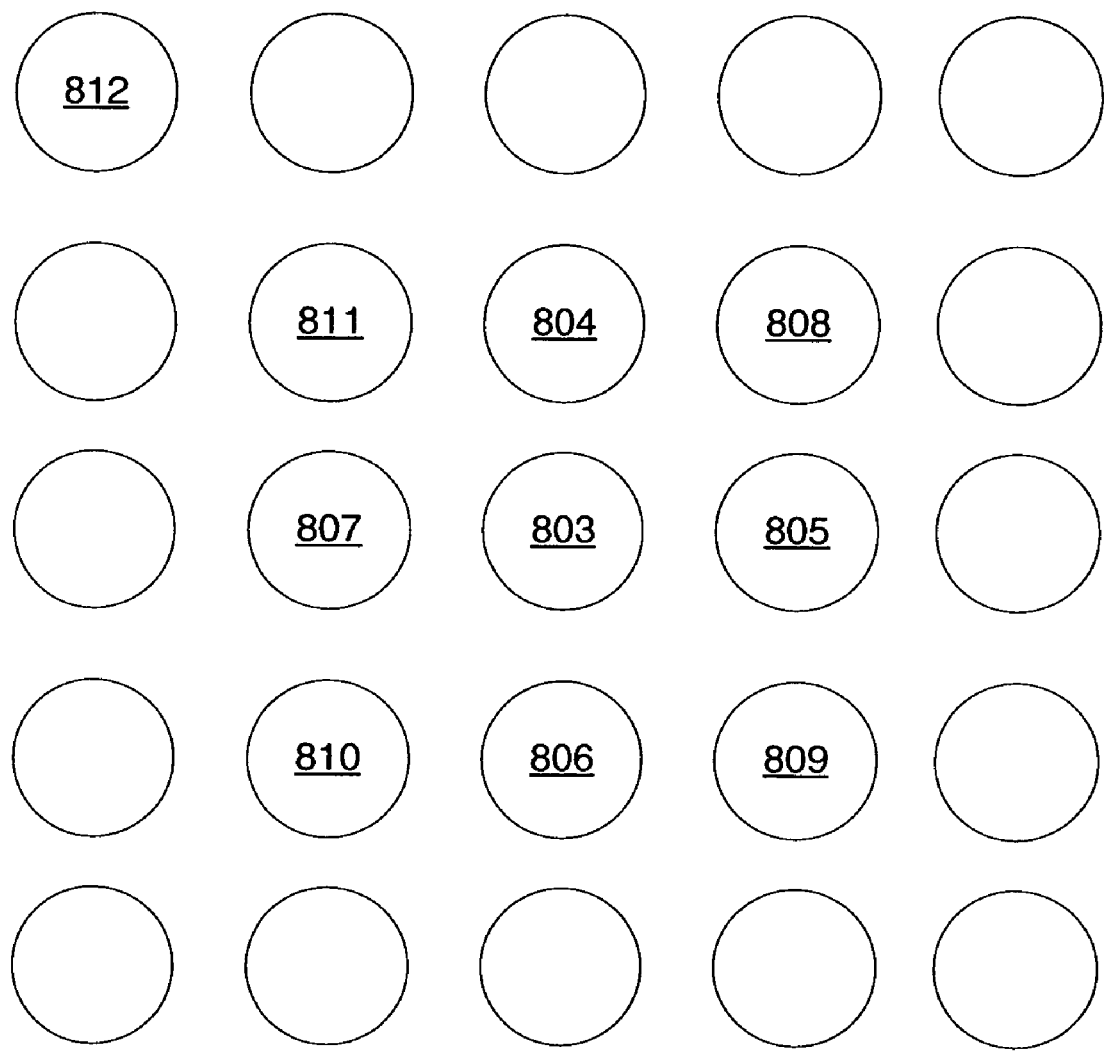

FIG. 8*a* illustrates an example screen 801 that may be rendered using one or more aspects of the present invention. The screen 801 may be rendered on any type of display, such as a computer monitor, television, PDA, etc. In FIG. 8*b,* the screen 801 is shown as being displayed using a number of pixels 802. Pixels 802 represent units of area on the display screen on which color may appear, and FIG. 8*c* illustrates a close-up representation of pixels that may appear on a display screen. Of course, although the pixels shown in FIG. 8*c* are depicted as round, pixels may come in a variety of shapes, depending on the display technology being used. Features described herein may be used on any of these displays and pixel types.

The image shown on screen 801 may be generated using a data structure having data representing the final color that is to appear at each pixel. For example, a color buffer may be created in memory to store one or more bits of information corresponding to each pixel location on the display device screen. This color buffer may take the form of a data array, and may, for example, store a 32-bit value representing the actual color that is to appear at each pixel location on the display screen. A 32-bit value would allow the display to display one of up to $2^{32}$, or 4,294,967,296, different color values for each pixel on the screen. Other color value sizes, such as 2-bit, 4-bit, 8-bit, 16-bit, 64-bit, 128-bit, 256-bit, etc. may be used to allow a larger/smaller palette of colors to be displayed on the screen. The array may have a single value for each pixel on the screen, so a color buffer for a screen having 1024×768 pixel resolution could have 786,432 entries, one for each pixel.

Figure 9:
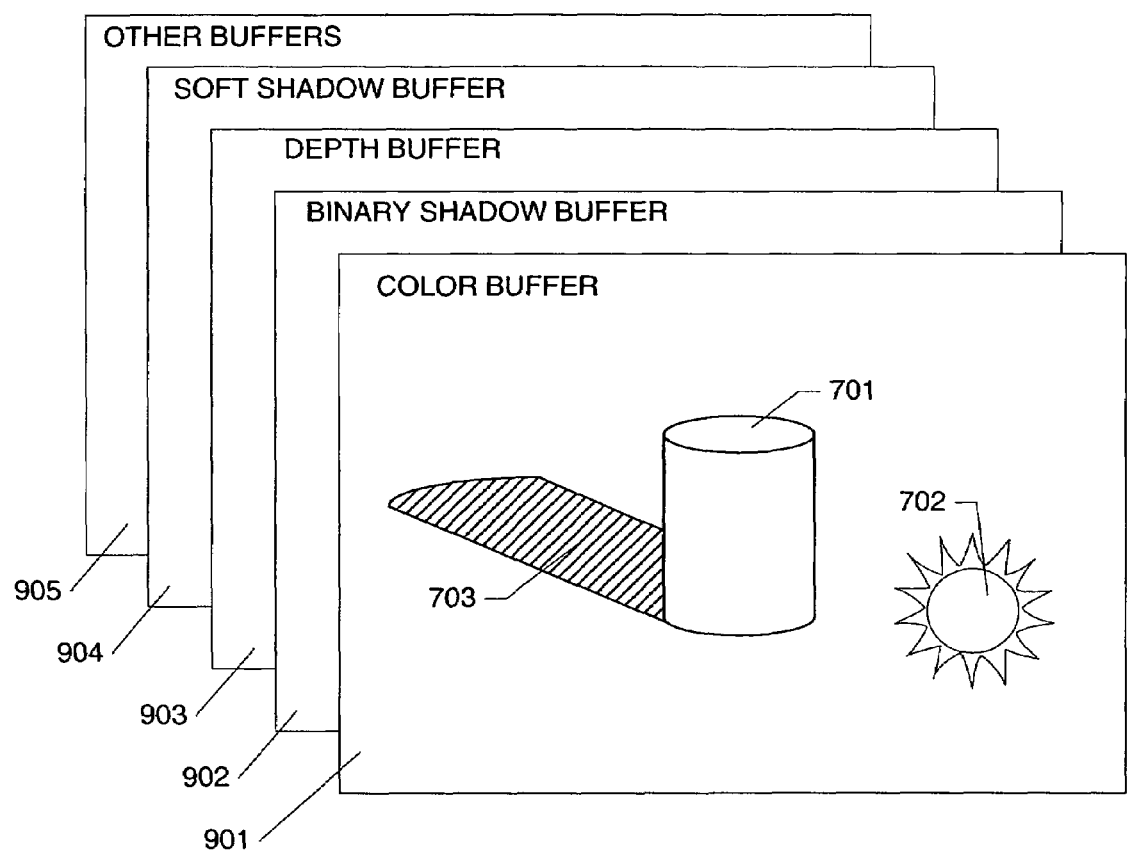
FIG. 9 illustrates a number of buffers that may be used with one or more aspects of the present invention.

As noted above, the color buffer may be an array of data showing the final color values that are to appear at each pixel on the display screen. Other buffers, however, may also be used to represent other aspects of these pixels, and some such buffers may be used in one or more aspects of the present invention. FIG. 9 conceptually illustrates various types of buffers that may be stored in one or more memories of systems employing one or more aspects of the present invention. For example, in addition to the color buffer 901 for the final display screen's colors, there may also be one or more binary shadow buffers 902. A binary shadow buffer 902 may be another data structure holding data for each pixel on the screen, and may have a single bit to indicate whether that particular pixel is in a particular shadow. For example, a '0' may indicate that the pixel is in the given shadow, while a '1' may indicate that it is not in the given shadow. If there are multiple light sources, the binary shadow buffer may indicate which pixels are in shadows of any of the sources. Alternatively, there may be a separate binary shadow buffer for each light source, indicating the shadowed areas generated by each source. Binary shadow buffers are typically generated using single point light sources, or through the use of stencil shadows, although other known methods may be used as well. Those skilled in the computer graphics art will recognize that there are a number of ways to generate a binary shadow buffer for modeled objects, and the generation details will not be repeated herein.

Figure 7:
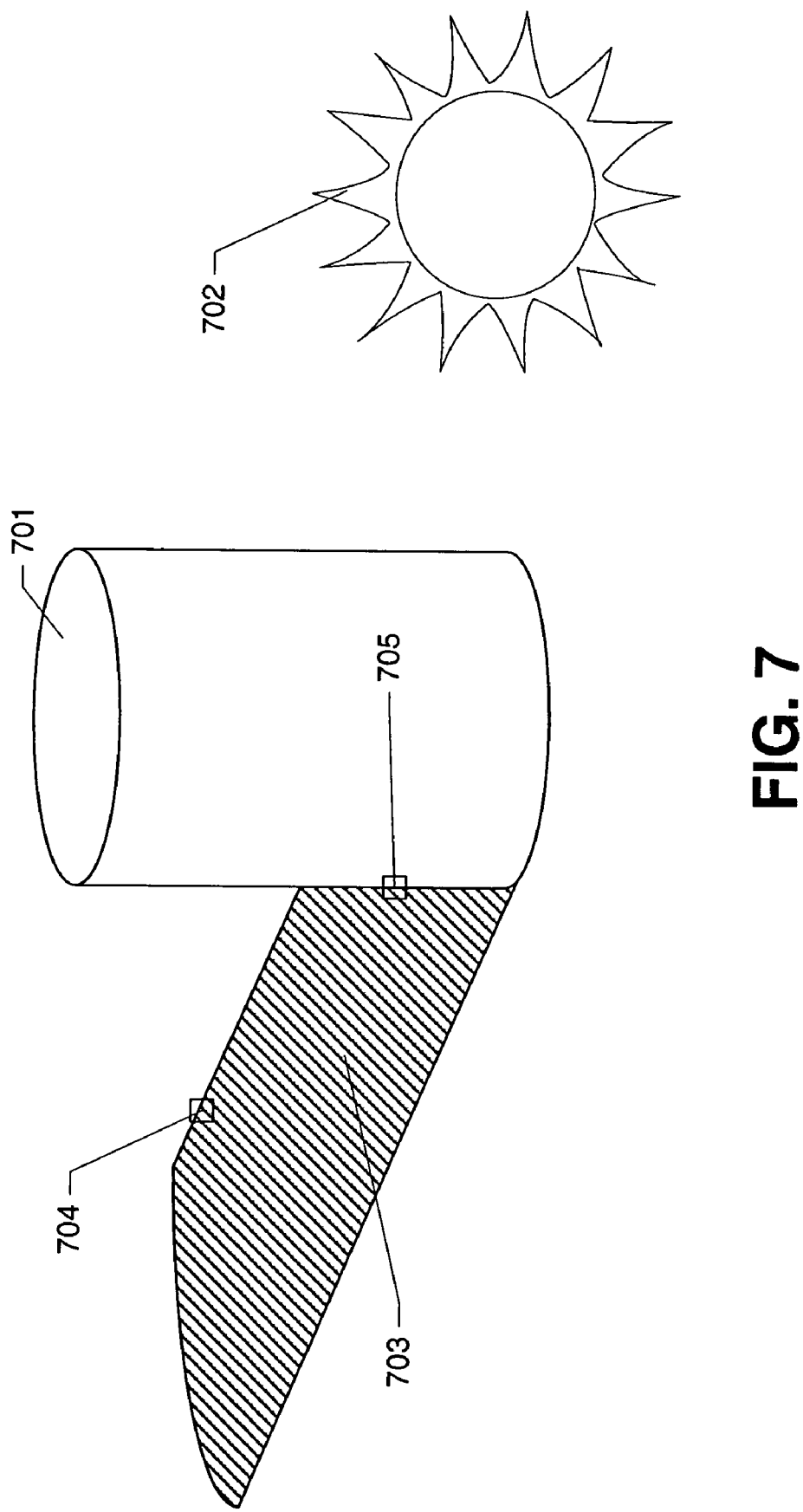
FIG. 7 illustrates an example scene, which can be rendered using one or more aspects described herein.

A depth buffer 903 may be used when the displayed scene is supposed to show objects that are modeled in three dimensions, where some objects in the scene are closer to the viewer than others. For example, referring to the scene in FIG. 7, the light source 702 is closer to the viewer than the occluding object 701. Accordingly, the depth buffer 903 for the scene shown in FIG. 7 may contain values identifying the various distances, or depths, occurring at each pixel location on the screen. In the depth buffer 903, the pixels of the light source 702 may have a value indicating a smaller distance than those used for the occluding object 701. The number of bits used in the depth buffer for each pixel may vary depending on the level of granularity desired for representing the image depth. If many different distances are to be possible, then a higher number of bits will be used. If only a few distances are desired, then a smaller number of bits will be used. For example, a given scene might only require 1024 different levels of depth for its objects, in which case the depth buffer 903 need only have 10 bits per pixel. In such a system, a pixel having a maximum depth (e.g., 11 1111 1111) will be farther away from the viewer than another pixel having a smaller depth (e.g., 10 1000 0100). Such a buffer can be generated by rendering a model and writing the depth value of each pixel as it is rendered into the color buffer. However, those skilled in the computer graphics art will recognize that there are a number of ways to generate a depth buffer for modeled objects, and the generation details will not be repeated herein.

Aspects of the present invention may result in the generation of the soft shadow buffer 904. The soft shadow buffer is another data structure whose data represent a degree of shadow for each pixel location on the screen, and may include 2 or more bits of data for each pixel. So, for example, a value of '0000' may indicate that the pixel is fully in shadow; a value of '1111' may indicate that the pixel is not in shadow, and the values in between (e.g., 0001, 0010, 0101, 0110, etc.) may indicate the partial degree of shadow. Having 4 or 8 bits per pixel in the soft shadow buffer can produce good blending/softening results using the process described below. Of course, any number of bits may be used per pixel—the more bits used, the greater degree of color/shadow, but the tradeoff is in longer computation times and greater required storage.

And finally, other buffers 905 (e.g., a red buffer indicating where the color red is to appear, a brightness buffer indicating a level of brightness for each pixel, etc.) may also be used.

Figure 10A:
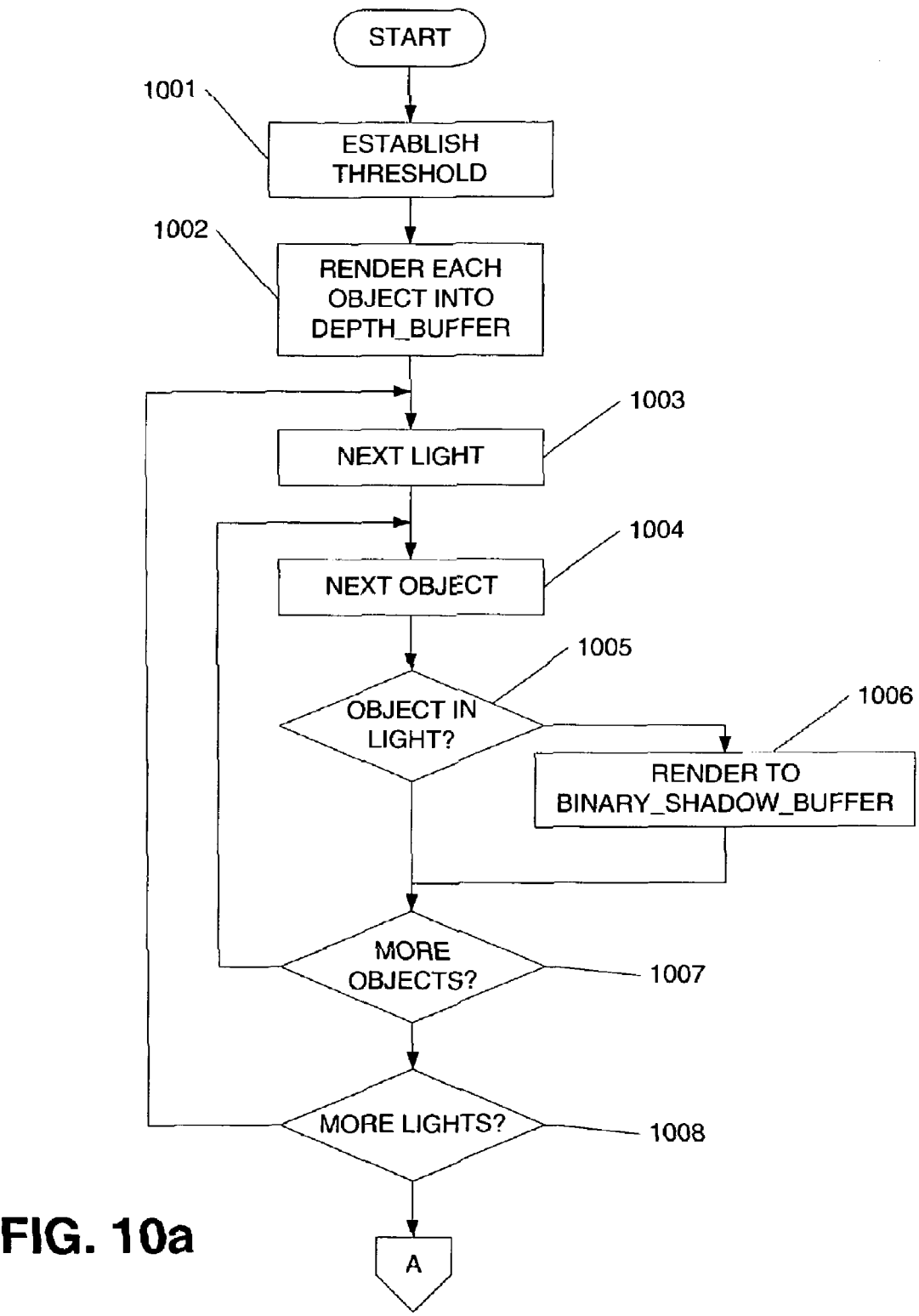
FIGS. 10a-b illustrate an example method for rendering softened images using one or more aspects of the present invention.
Figure 10B:
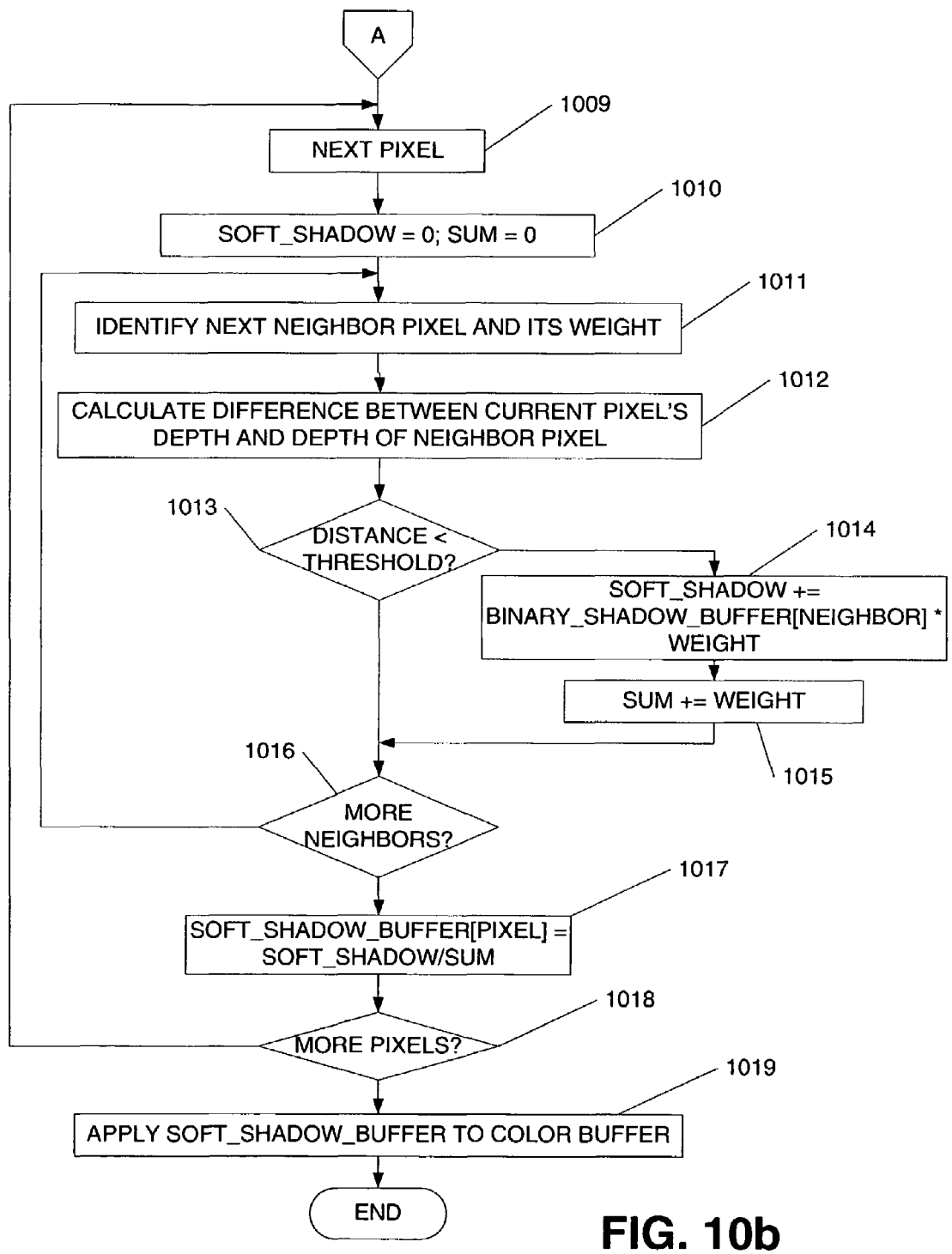

FIGS. 10a and 10b illustrate an example method for rendering a display using one or more aspects of the present invention. First, in step 1001, a blur threshold value is defined (the threshold value may be selected according to designer preference, user preference, and/or may be dynamically adjusted based on the objects and/or lighting in the displayed image). This threshold value will be used in later calculations, as explained below, to determine whether a particular pixel location should have its soft shadow buffer value adjusted to create a blurring effect. The actual threshold value may be heuristically determined to identify a value that generates visually-appealing and acceptable results, and may vary depending on the particular implementation. The actual value can be defined based on various unique scene characteristics using, for example, the units of measurement in the depth buffer, the camera near and far plane values, the depth buffer resolution, and any other factors known to those skilled in the art. For example, one value that can be used can be determined using the following equation: Threshold Value=0.5/(Zfar−Znear), where Zfar and Znear are the absolute values of the far and near plane depth values from the depth buffer.

In step 1002, each object appearing in the scene is rendered into the depth buffer. As noted above, this step generally involves identifying, for each pixel in the screen, a relative distance from the viewer for the pixel, and storing a data value for the corresponding pixel location in the depth buffer. The end result is a buffer data structure that shows a relative depth for each of the pixels on the screen. Any known method of generating a depth buffer, will suffice for the present method.

Step 1003 begins a process of creating a binary shadow buffer by considering each light source. Step 1003 considers the first light source (or, in later iterations, the next light source), and for each light source, a sub-process considers each object. Step 1004 begins this sub-process by considering the first object in the scene (or, in later iterations, the next object). For each object, a test is made in step 1005 to determine whether the particular object is illuminated by the light under consideration. If the object is in the light, then the corresponding shadow is rendered into the binary shadow buffer in step 1006. Various methods of rendering binary shadow buffers may be used, such as through stencil shadows, shadow buffers projected into screen space, and/or pre-calculation of binary shadows off-line. Step 1007 ensures that this process repeats for every object in the scene, and step 1008 ensures that every light is considered.

Step 1009 begins another looping process that assigns, for each pixel on the screen, a soft shadow value to that pixel's entry in the soft shadow buffer 904. Step 1009 begins with selecting the first pixel in the scene (and, in later iterations, the next pixel) as the current pixel under consideration. In step 1010, a number of data values may be initialized for the current pixel. A SOFT-SHADOW variable may be initialized to zero, and may be used in subsequent calculations to keep track of the ultimate soft shadow buffer value that is to be assigned to the current pixel. A SUM value may also be initialized to zero, and may be used to keep a running total of the various weight values used in the calculations that follow.

Step 1011 begins a sub-process that performs a calculation for each of the current pixel's neighbor pixels. In step 1011, an algorithm, such as a filter kernel, is used to identify the first neighbor pixel (and, in later iterations, the next neighbor pixel) and that neighbor pixel's weight. For identifying neighbors, the filter kernel can sequentially identify the four neighbors above, below, to the right and to the left of the current pixel. So as shown in FIG. 8c, step 1011 for current pixel 803 may address neighbor pixels 804, 805, 806 and 807 in order. Other algorithms or filter kernels for identifying neighbors may be used instead. For example, an algorithm may address eight surrounding pixels (pixels 804-811); or a different algorithm can address further pixels, such as pixel 812. In some aspects, a filter kernel may step through all neighbors in a 4 or 5 pixel radius around the current pixel. The actual selection of a filter kernel for identifying neighbors can vary depending on the particular application being developed, and may be heuristically selected. If greater accuracy in shadow blurring is desired, then a kernel selecting more neighbors may be desirable. Conversely, if processing is to be minimized, then a kernel selecting fewer neighbors may be desirable. As a further example, the filter kernel need not be static, and may instead vary depending on factors such as the distance between the current pixel and the light source, the distance between the current pixel and the shadow casting object, etc. In some aspects, a Gaussian filter kernel may be used, although the techniques described herein are not limited to this filtering method.

As noted above, in addition to the selection of the first/next neighbor pixel, the filter kernel algorithm in step 1011 may also identify a relative weight to be given to the neighbor pixel. The weight may indicate the relative effect the neighbor will have on the current pixel under consideration, as compared with the effect caused by other neighbors. For example, the filter kernel may assign a higher weight value to those neighbor pixels that are closest to the current pixel. Using the FIG. 8c pixels as an example, if pixel 803 is the current pixel under consideration, pixel 811 may be given a higher weight value than pixel 812 since pixel 811 is closer to pixel 803. As with the selection of neighbor pixels, the assignment of weight may also be heuristically made based on the particular implementation and the programmer's desires, and may be a function of the particular filter kernel being used. For example, in some instances, a Gaussian filter kernel is used to identify neighbor pixels and to provide weight values for the identified neighbors.

When the neighbor pixel has been identified, step 1012 accesses the depth buffer 903 to identify the depth values for the current pixel and its selected neighbor pixel, and the difference between these two values is calculated. In step 1013, this difference is compared with the predetermined blur threshold, and if it is smaller than the blur threshold, the process will move to step 1014 to allow this neighbor pixel to affect the current pixel's shadow.

In step 1014, the SOFT_SHADOW value is adjusted to add a weighted version of the neighbor pixel's binary shadow buffer value. In other words, the binary shadow buffer 902 is accessed, and the value for the neighbor pixel (e.g., a '1' if the neighbor is not in shadow, and a '0' if it is in shadow) is obtained. This value is then multiplied by the weight identified for the neighbor pixel in step 1011, and that result is added to the SOFT_SHADOW data value. In this manner, the neighbor pixel can affect the current pixel's soft shadow value.

In step 1015, the weight of the neighbor pixel is added to the SUM value, so that a running total of the applied neighbor weights is maintained.

In step 1016, a check is made to see if, according to the selected algorithm or filter kernel in step 1011, there remains another neighbor pixel to address. If there is, then the process returns to step 1011 to identify that next neighbor and its weight. If there are no more neighbor pixels to address, the process moves to step 1017, where the current pixel's value in the soft shadow buffer 904 is computed. This computation may involve setting the pixel's value in the soft shadow buffer 904 to a value equal to SOFT_SHADOW divided by SUM, to obtain a shadow value that is normalized to weight.

In step 1018, a check is made to determine whether additional pixels need to be addressed, and if so, the process returns to step 1009 to perform the same analysis for the next pixel. If there are no more pixels to address, then the soft shadow buffer 904 contains a value for every pixel indicating that pixel's degree of shadow. In step 1019, the values in the soft shadow buffer 904 may then be applied as inputs to a shading function to modify the pixel data in the color buffer 901. Any desired shading function, such as the Phong shading function, can be used. When a shading function is modifying the color of a given pixel, it may receive that pixel's soft shadow buffer 904 value as an input, and it may receive other inputs as well, such as light position(s), direction, material colors, normal maps, etc. A simple shading function may take the color buffer value for a given pixel, and darken the color shade by an amount corresponding to the soft shadow buffer value for that pixel.

After the soft shadow values have been used to shade the color buffer values, the process has shaded a single image and the process may terminate. Of course, the process may repeat when generating another image or frame of video.

Figure 11:
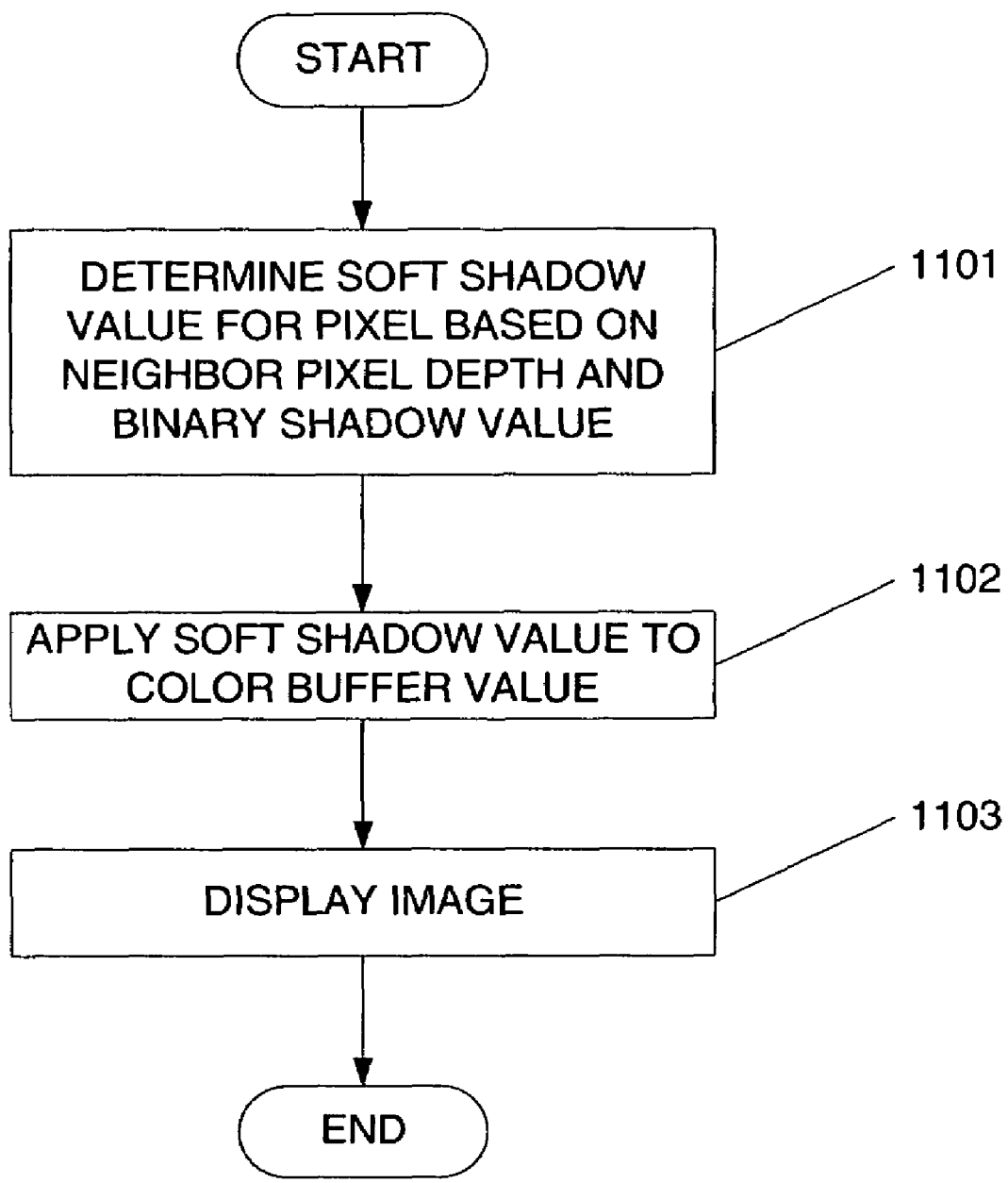
FIG. 11 illustrates an example process using one or more aspects described herein.
Figure 12A:
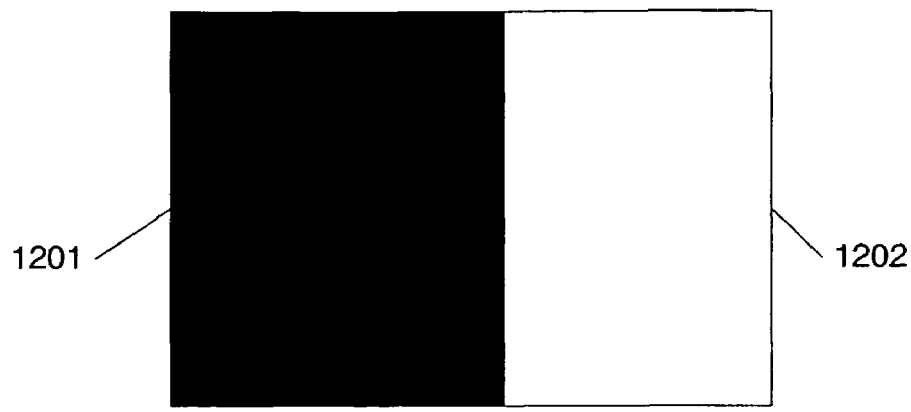
FIGS. 12a-d illustrate example close-up images of shadow effects.
Figure 12B:
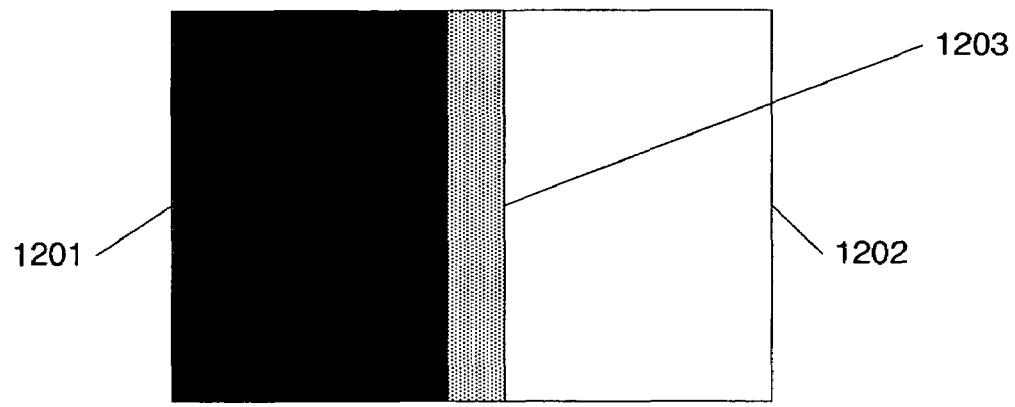
Figure 12C:
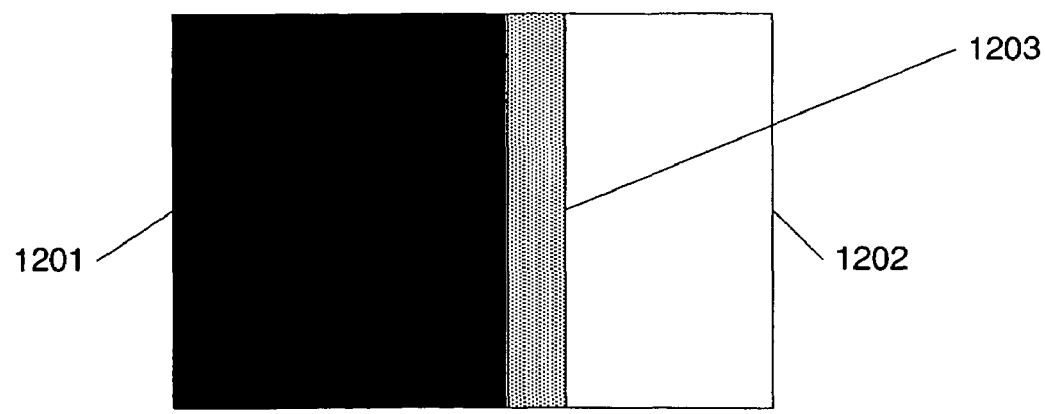
Figure 12D:
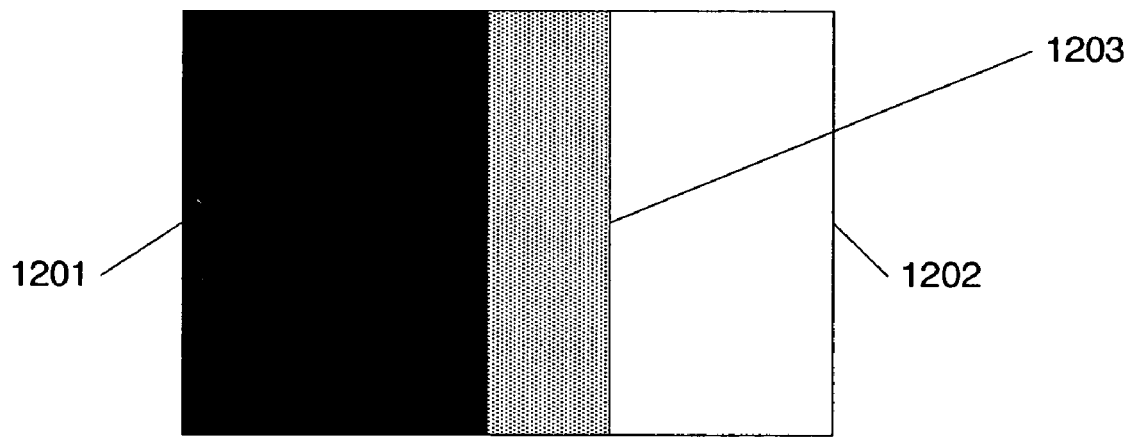

The process described above is just one example process using several aspects of the invention described herein. Other modifications are certainly possible. For example, the various process steps described above may be rearranged, divided into sub-steps, and/or combined into single steps to achieve the same effect. Some steps may be removed altogether if desired. For example, the FIGS. 10*a-b* example generates a soft shadow buffer 904 before applying any of its values to the color buffer 901. As an alternative, the calculated soft shadow value may be used immediately to shade the current pixel's value in the color buffer (e.g., step 1019 may occur on a pixel-by-pixel basis immediately after, or as part of, step 1017). In such an embodiment, a separate soft shadow buffer 904 need not be stored as a separate buffer. Of course, the buffer 904 may still be stored and used for later renderings. FIG. 11 illustrates a simplified version of the example process described above. In step 1101, a given pixel's shadow buffer value may be determined based on the depth value and binary shadow value of the pixel's neighbor(s) (e.g., using comparisons as described above or in alternatives described below). Step 1102 entails the application of the shadow buffer value to the color buffer for the pixels displayed on the screen, and the final image is displayed in step 1103. These steps may use the steps described above and/or the alternatives described below.

The FIGS. 10*a-b* process illustrates the generation of a single binary shadow buffer for multiple objects in the scene. As another alternative, multiple binary shadow buffers may be separately generated, and multiple soft shadow buffers can be generated, per light source. In such an alternative, the necessary process steps may simply be repeated to address these buffers individually.

The FIGS. 10*a-b* process, by steps 1009 and 1018, may be used to process every pixel appearing on the display screen. As an alternative, the process may be modified to address only those pixels that appear near the border between shadow and light, as defined in the binary shadow buffer(s). To accomplish that, step 1018 may include an algorithm to identify pixels that are near this border, which can be accomplished in a variety of ways. The algorithm can simply traverse the binary shadow map, pixel-by-pixel, and flag the pixels whose neighbors are of a different value. The algorithm may also flag a number, e.g., 1, 2, 3, 4, 5, 6, etc. of additional nearby pixels to include in the processing. Alternatively, if the shape of the shadow in the binary shadow buffer is defined by an equation (e.g., a circular shadow having center at the 300, 300 position on the screen and having radius of 25 pixels), then the border pixels may be flagged through calculations (e.g., addressing only those pixels that are within 4-5 pixels of the circumference of that circle). Any of the edge detection techniques known to those skilled in the art may be used, although in some cases the algorithm described herein may be sufficiently efficient to dispense with such edge/border detection.

As another alternative embodiment, steps 1003-1008 may be omitted if the binary shadow buffer 902 is provided from some other source, such as a separate process. Also, the logical assignment of binary '1' and '0' may be reversed (e.g., instead of '1' indicating that a pixel is not in shadow, a '0' may be used for that purpose, etc.), and corresponding changes to the process will be used.

As another alternative, the blur threshold may be a predetermined, fixed, value, or it may be altered according to designer and/or user preference. The threshold may also be altered depending on the type of scene being displayed (e.g., different sizes, shapes and locations of light sources and/or objects may affect the desired threshold). Similarly, the size of the filter kernel may also be dynamically altered using specific characteristics of the scene. For example, the distance between the shadow receiver and the shadow caster or the light source may be used to approximate penumbra falloff. This may be done, for example, by comparing depth values for pixels corresponding to the shadow receiver and shadow caster or light source, and the larger this distance, the larger the kernel size.

The process above is described in terms of generating soft shadow buffer data that may be used to soften the appearance of shadows on a screen display. FIGS. 12*a-d* illustrate close-up examples of how this might affect a displayed image. For example, an original binary shadow buffer might simply indicate that a portion 1201 of the image is in shadow, and another portion 1202 is outside of shadow. By using aspects described herein, the sharp contrast between portions 1201 and 1202 may be softened by adjusting the color values of an intermediate portion 1203. The portion 1203 may appear in the area of the shadow (e.g., FIG. 12*b*), outside the shadow (e.g., FIG. 12*c*), or a combination of the two (e.g., FIG. 12*d*).

The process and system, however, are not limited to softening shadows. Indeed, any other type of light and/or color softening and/or blurring may benefit from application of the process described herein. For example, the soft shadow buffer may be used to create a color bloom effect around an object. Such an effect may be accomplished by passing the soft shadow buffer values to a shading function that addresses colored objects (not merely shadows). For example, smoke, fire, dust, ghost, simulated light shafts, and other visual effects may also benefit from the techniques described herein. Indeed, in some instances, the techniques described herein is particularly attractive compared to other soft shadowing methods in that it may be used to blur an entire image, without requiring edge detection, to achieve a desired visual effect.

The features described herein are preferably encoded in computer software as executable instructions that can be executed on a computing device, such as a personal computer or video game console, to result in the display of the screens shown in the figures, and may use a graphics application program interface (API), such as Direct3D. Also, although various features are described above, it is not necessary to practice them all in the same embodiment. Instead, various combinations and subcombinations may be implemented as desired, and the true scope of the present invention should only be limited by the claims that follow.

The invention claimed is:

1. A computer-readable medium having computer-executable instructions for performing the following steps:
   accessing a depth buffer identifying depth values for a plurality of pixels on a display screen;
   calculating a difference in depth between a first pixel and a neighboring pixel adjacent to the first pixel;
   comparing the difference with a predetermined threshold, and if the difference is less than the threshold:
      calculating a soft shadow value for the first pixel, wherein the step of calculating further includes the steps of:
         accessing a binary shadow buffer identifying whether said pixels are in shadow; and
         ascertaining a binary shadow buffer value for the first pixel, wherein the step of ascertaining further includes the step of weighting the binary shadow buffer value for the neighbor pixel by a weighting value, wherein the weighting value is determined using a distance value of the neighbor pixel, wherein the distance value is the distance between the neighbor pixel and the first pixel; and
      modifying a color buffer value of the first pixel in accordance with the soft shadow value; and
   using the modified color buffer value to generate a display on a screen.

2. The computer-readable medium of claim 1, further having computer-executable instructions for performing the following steps:
   identifying a plurality of additional neighboring pixels;
   for each of the additional neighboring pixels, determining a second difference in depth between the first pixel and the additional neighboring pixel; and
   if the second difference is less than the threshold value, calculating a soft shadow value for the additional neighboring pixel, and
   including the soft shadow value for the additional neighboring pixel in the step of modifying.

3. The computer-readable medium of claim 2, wherein the step of calculating a soft shadow value for the additional neighboring pixel further includes the step of modifying the binary shadow buffer value for the additional neighboring pixel by a weight value for the additional neighboring pixel.

4. The computer-readable medium of claim 3, wherein the step of including further comprises the step of adding the soft shadow value for the additional neighboring pixel to the soft shadow value for the neighboring pixel adjacent to the first pixel.

5. The computer-readable medium of claim 4, wherein the step of including further comprises the step of dividing the added soft shadow values by a sum of the weight values for the plurality of additional neighboring pixels and the neighboring pixel adjacent to the first pixel.

6. The computer-readable medium of claim 2, wherein the step of identifying a plurality of additional neighboring pixels uses a filter kernel algorithm.

7. The computer-readable medium of claim 1, wherein the step of using results in a color bloom on the display.

8. A method for adjusting the color of portions of a computer graphics image, comprising the steps of:
   storing a first buffer having a depth value for each of a plurality of pixels in a computer graphics image;
   storing a second buffer having a binary value for each of the plurality of pixels, the binary value identifying whether the pixel is in shadow;
   considering each of a plurality of the pixels, wherein the step of considering comprises the steps of:
      identifying a plurality of neighbor pixels of the considered pixel;
      calculating a difference in depth between the considered pixel and each of its neighbor pixels using the first buffer; and
      using this difference to modify a color value of the considered pixel comprising the steps of:
         retrieving a corresponding binary value for a neighbor pixel from the second buffer; and
         amount based on the retrieved binary value for the neighbor pixel, wherein the step of adjusting comprises the steps of: multiplying the retrieved binary value by a weight value for the neighbor pixel; adding the multiplication result to a soft shadow value total maintained for the considered pixel during the step of considering; and dividing the soft shadow value total by a sum of weight values for neighbor pixels; and generating a display of the image using the modified color value.

9. The method of claim 8, wherein the weight value for the neighbor pixel is determined based on a distance of the neighbor pixel, wherein the distance is the distance between the neighbor pixel and the considered pixel.

10. The method of claim 8, wherein the step of generating comprises the step of supplying adjusted soft shadow values to a shading function.

11. The method of claim 8, wherein the step of considering considers only pixels that are on a border between in shadow and not in shadow, as indicated in the second buffer.

12. The method of claim 8, wherein the step of considering considers every pixel on a display screen.

13. The method of claim 8, wherein the step of using the difference to modify a color value of the considered pixel comprises the steps of:
   comparing the difference with a predetermined threshold; and
   modifying the color value only if the difference is less than the predetermined threshold.

14. A method for displaying computer images on a display, comprising the steps of:
   accessing a depth buffer identifying depth values for a plurality of pixels in a computer image;
   identifying a set of neighboring pixels adjacent to a first pixel, wherein a variable weight factor is assigned to each of the set of neighboring pixels based on a relative effect each neighboring pixel has on the first pixel;
   calculating a difference in depth between the first pixel and each of the set of neighboring pixels adjacent to the first pixel;
   comparing each difference with a threshold, and for each of the set of neighboring pixels where the difference is less than the threshold:

calculating a component of a soft shadow value for the first pixel, wherein the calculating comprises:

accessing a binary shadow buffer indicating whether the first pixel and each of the set of neighboring pixels are in shadow based on their binary shadow buffer value; and weighting the binary shadow buffer value of the neighboring pixel using the neighboring pixel's assigned weight factor; and ascertaining the soft shadow value for the first pixel by adding all components of the soft shadow value for the first pixel; and dividing the soft shadow value by the sum of the weight values for each of the set of neighboring pixels having a difference that was determined to be less than the threshold, wherein the dividing results in a normalized soft shadow value;

adjusting a color value for the first pixel in a computer image based on the normalized soft shadow value; and displaying the first pixel.

15. The method for displaying computer images on a display of claim 14, wherein the identified set of neighboring pixels and each of their associated weight values are determined using a filter kernel algorithm.

16. The method for displaying computer images on a display of claim 14, wherein the threshold is determined heuristically.

17. The method for displaying computer images on a display of claim 14, wherein in the step of identifying, the set of neighboring pixels are heuristically selected.

18. The method for displaying computer images on a display of claim 14, wherein each of the assigned weight factors are heuristically selected.

* * * * *